United States Patent
Tilt et al.

(10) Patent No.: US 9,661,216 B2
(45) Date of Patent: *May 23, 2017

(54) AUTOMATIC IMAGE CAPTURE

(71) Applicant: IPARSE, LLC, Beaverton, OR (US)

(72) Inventors: Christopher E. Tilt, Portland, OR (US); Rex H. Stevens, Beavertson, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/056,972

(22) Filed: Feb. 29, 2016

(65) Prior Publication Data

US 2016/0182819 A1   Jun. 23, 2016

Related U.S. Application Data

(63) Continuation of application No. 13/998,209, filed on Oct. 11, 2013, now Pat. No. 9,307,206, which is a continuation-in-part of application No. 13/136,958, filed on Aug. 16, 2011, now Pat. No. 8,559,766.

(51) Int. Cl.
| | |
|---|---|
| *G06K 9/00* | (2006.01) |
| *H04N 5/232* | (2006.01) |
| *H04N 7/18* | (2006.01) |
| *G06K 9/18* | (2006.01) |
| *G06T 1/00* | (2006.01) |

(Continued)

(52) U.S. Cl.
CPC ......... *H04N 5/23222* (2013.01); *G06K 9/186* (2013.01); *G06T 1/0007* (2013.01); *H04N 1/00137* (2013.01); *H04N 1/00167* (2013.01); *H04N 5/232* (2013.01); *H04N 5/23293* (2013.01); *H04N 7/18* (2013.01); *H04N 2101/00* (2013.01); *H04N 2201/0084* (2013.01); *H04N 2201/0086* (2013.01)

(58) Field of Classification Search
CPC .. H04N 7/18; H04N 1/00137; H04N 1/00167; H04N 5/232; H04N 5/23222; H04N 5/23293; H04N 2101/00; H04N 2201/0084; H04N 2201/0086; G06K 9/186; G06T 1/0007
USPC ........................................ 382/140, 199, 321
See application file for complete search history.

(56) References Cited

U.S. PATENT DOCUMENTS 7,016,704 B2 * 3/2006 Pallakoff .................. G06F 3/14
455/419
8,577,118 B2 * 11/2013 Nepomniachtchi .. G06K 9/3275
382/137

(Continued)

*Primary Examiner* — Kanjibhai Patel
(74) *Attorney, Agent, or Firm* — Paul B. Heynssens Attorney at Law, PLC

(57) ABSTRACT

An improved automatic image capture system for an intelligent mobile device having a camera guides a user to position the camera so only a single image needs to be automatically captured. Syntactic features, using a view finder on a display of the intelligent mobile device, are used to guide a user to maximize the occupancy of the view finder with the document so that the document is maximized within the view finder based upon detected corners of the document. When occupancy is maximized, the camera automatically captures the image of the document for post-processing using semantic knowledge of the document. A confidence level is computed based on the semantic knowledge to qualify an image with greater accuracy, and without user intervention, prior to transmission to a remote site.

20 Claims, 9 Drawing Sheets

(51) Int. Cl.
*H04N 1/00* (2006.01)
*H04N 101/00* (2006.01)

(56) References Cited

U.S. PATENT DOCUMENTS 8,699,779 B1 * 4/2014 Prasad .................... G06K 9/32
 382/137
9,076,171 B2 * 7/2015 Cooley ................ G06Q 20/102

* cited by examiner

AUTOMATIC IMAGE CAPTURE

CROSS-REFERENCE TO RELATED APPLICATIONS

The present invention is also a continuation of co-pending U.S. patent application Ser. No. 13/998,209 filed Oct. 11, 2013 entitled "Automatic Image Capture" which is a continuation-in-part of issued U.S. Pat. No. 8,559,766 filed Aug. 16, 2011 entitled "Improved Automatic Image Capture" by the present inventors, and claim the benefit of such filing date for content herein which is the same.

BACKGROUND

The present invention relates to image processing, and more particularly to an improved automatic image capture method using an intelligent mobile device, such as a wireless telephone having a camera.

Conventional image capturing devices, such as cameras and scanners, typically require human or other external intelligence to select the appropriate image for a specific application. While this is sufficient for some image capture systems, many systems require very precise images for processing.

One such example is the new methodology being used by banking institutions for deposit of checks remotely via an intelligent mobile device, such as a wireless telephone, as exemplified by U.S. Pat. Nos. 7,778,457, 7,949,176 and 7,953,268 entitled "Systems [Methods] for Mobile Image Capture and Processing of Checks [Documents]" by Grigori Nepomniachtchi and assigned to Mitek Systems, Inc. of San Diego, Calif., and further shown in a video at http://www.youtube.com/watch?v=sGD49ybxS2Q. Another video of a method used by USAA Bank is shown at http:www.youtube.com/watch?v=waBQqsSq2NM which describes the USAA Deposit@Mobile system using an iPhone® mobile device, apparently also using the system/method described in the above patents. With this system/method an appropriate application is downloaded to the iPhone device once the user is qualified by USAA Bank. The user accesses the application on the iPhone device and enters the amount of the check. Then the user uses a camera which is part of the iPhone device to capture an image of both the front and back of the check by, for each instance, lining up the check to be captured within a rectangular graticule or frame on the iPhone viewing screen. Once the images are captured, the user is asked to verify the images and then submit the images to USAA Bank. The captured images of the check are then transmitted via wireless or WiFi to USAA Bank. However it can be tedious and difficult for the user to properly align the image of the check within the rectangular graticule, and motion by the user in taking the picture often results in unusable images. Also in some instances the banking institution may require that the check still be sent to the bank as well since the captured image may not satisfy Federal Reserve Board standards regarding legal replacement checks.

U.S. Pat. No. 8,532,419, issued Sep. 10, 2013 to Mike Coleman entitled "Automatic Image Capture" and assigned to iParse, LLC of Beaverton, Oreg., describes an automatic image capture system that does not require human intervention. A user, having the appropriate application downloaded on the intelligent mobile device, aims the device camera at an object or document to be captured. The device camera starts capturing images of the object, and each image is qualified to determine whether it is in focus and within the camera field of view. Qualified images are stored for further processing, such as alignment by an appropriate perspective transformation to assure they each fill a common reference frame, before transmission to a remote location.

One disadvantage of the above-described automatic image capture system is that it still takes the user a little time to aim the camera at the object, preferably directly from above. As a result, the user and camera could cast a shadow on the object, making it more difficult to capture a clear image. Preferably the camera should be able to capture a single image, rather than taking a plurality of images and qualifying each one.

What is desired is an improved automatic image capture system that is easy to use and guides the user to place the camera of the intelligent mobile device in such a position that only a single image needs to be captured.

SUMMARY

Accordingly the present invention provides an improved automatic image capture system for an intelligent mobile device having a camera that guides a user to position the camera so only a single image needs to be automatically captured. Application software residing on the intelligent mobile device guides the user, using a trapezoidal view finder on a display of the intelligent mobile device, to orient the camera with respect to a target document so there is an appropriate pitch and roll angle between the camera and the target document to avoid shadows caused by the camera or user. The image of the target document within the view finder is tested for sufficient brightness and contrast with a background on which the document resides. The user is then guided to move closer or farther from the document so that the document is maximized within the view finder. Then the corners of the document are located, and the camera is checked to see is the displayed document image is focused. Alternatively, the corners of the document may be located by identifying lines that form edges of the document, the intersections of which are used to locate the corners, prior to maximizing the document image in the view finder and checking focus. The camera may also be checked for stability, since excessive movement may cause blurring. When all of the above conditions are satisfied, the application software automatically has the camera capture the image of the document for post-processing. If any of the above conditions fall out of limits prior to the automatic capture step, the process returns to the step immediately preceding the failed step and repeats the steps until all the conditions are met.

Additionally semantic knowledge of the type of document being captured is used to compute quantitative measurements based on such semantic knowledge. Such quantitative measurements may then be used to modify capture parameters to improve the quality and/or accuracy of the captured document, or to select an acceptable image. Further the modified capture parameters may be used to improve the capture process until a quantitative measurement threshold is met in order to acquire the final accepted document.

The objects, advantages and other novel features of the present invention are apparent from the following detailed description when read in conjunction with the appended claims and attached drawing figures.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The system requirements for the improved automatic image capture system described below are: [0020] 1. An intelligent mobile device, such as a smart phone, that has a high resolution video camera; [0021] 2. An operating system (OS) on the intelligent mobile device that provides access to individual video frame data; [0022] 3. A high quality display and graphical library capable of rendering images, graphics and text; and [0023] 4. Application software running on the OS that provides the algorithms and guidance to capture an image.

The intelligent mobile device may also contain motion sensors, illumination and network connectivity.

A user is guided by the application software to improve the conditions needed to capture a high quality image suitable for submission to a remote location, such as a financial or other business/legal institution as an example. The image must be of high enough quality, properly framed and properly filtered so that the rate of rejected images at the remote location is as low as possible. By combining the user with the application software, the best possible image capture is possible. The proximity of the application software within the intelligent mobile device provides realtime feedback that reduces user frustration, eliminates delay in roundtrip submissions to a back-end system at the remote location, and gives immediate indication of success to the user. The result is a much lower error rate than conventional solutions that ship a generic, un-corrected image to the back-end system that performs the processing without user cooperation. This benefits both the user and the remote location institution with higher customer satisfaction and lower cost of operation.

The user may capture a printed rectangular document, i.e., acquire a centered and cropped image of the document in the form of an electronic image, such as PNG, TIFF, JPEG, etc. files, suitable for transfer across standard internet protocols in the following manner. First, the user places the document on a contrasting, pattern-free surface—generally a dark background since most documents are produced on light material. The user ensures sufficient lighting, and then holds the camera of the intelligent mobile device at a preferred angle with respect to the document to eliminate any shadows. Then the user looks at the device display to see a live video image of the document provided by the camera. The user frames the document within a target view finder displayed on the device, and follows the feedback from the application software to improve camera angle, lighting, contrast, occupancy, orientation, focus and motion stability. When all the conditions are right, the camera automatically captures the image, i.e., takes a picture of the document, and the application software automatically performs post-processing of the image to de-skew and filter the image into a format suitable for reception by the remote location for back-end processing.

Figure 1:
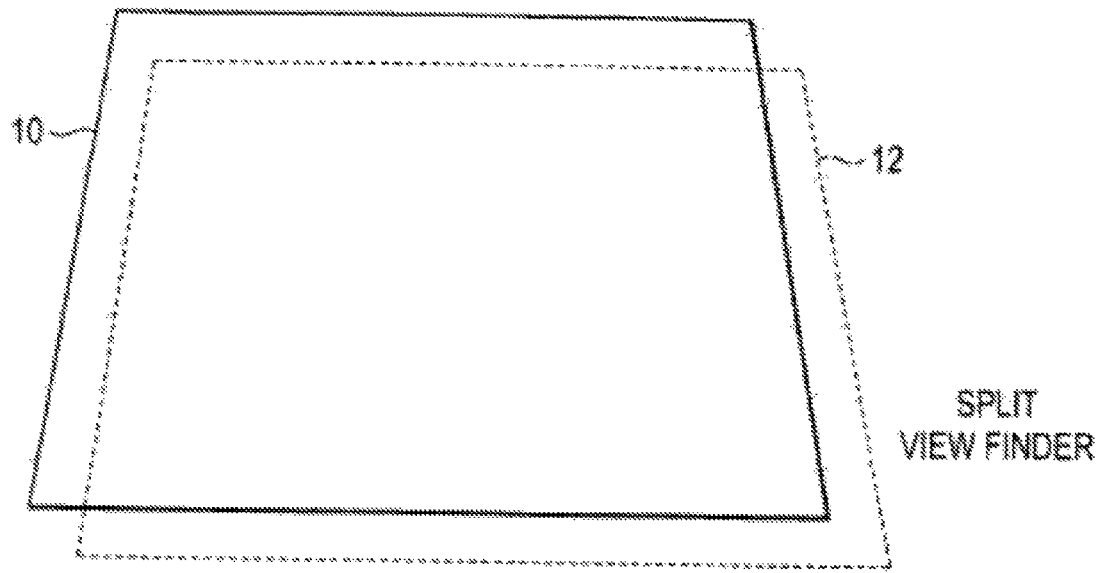
FIG. 1 is a plan view of a split view finder display for automatic image capture according to the present invention.

The application software provides a view finder 10, as shown in FIG. 1, to guide the user to hold the camera at a preferred angle, or pitch, with respect to vertical. Conventionally the camera is held at a zero angle with respect to vertical. However the preferred angle is offset from vertical, such as between fifteen (15) and twenty (20) degrees relative to vertical with respect to the document to be captured. By holding the camera tipped back, the illumination source is much less likely to cast a shadow of the camera and user's hands onto the document. The view finder 10 has a trapezoidal shape, as opposed to the conventional rectangular shape, to match the perspective of the document as seen when looking through the camera when it is tipped back by the preferred angle so the user can naturally align the document's sides and top with the perspective view finder. The view finder 10 is static within the display. A secondary view finder 12 of corresponding shape to the static view finder 10 is provided and moves with the movement of the camera relative to the document. This forms a split view finder together with the static view finder 10. The user is guided to line up the two trapezoidal view finders 10, 12, i.e., move the camera until the secondary view finder is superimposed on the static view finder, which results in the correct pitch and roll (zero degrees). The outlines of the two view finders 10, 12 may be an appropriate negative color, such as cyan or red, so long as the camera is misaligned with the document. When the two view finders 10, 12 are sufficiently superimposed on each other, indicative of proper alignment, the view finders may change to a positive color, such as green, to indicate successful alignment in pitch and roll.

Figure 2:
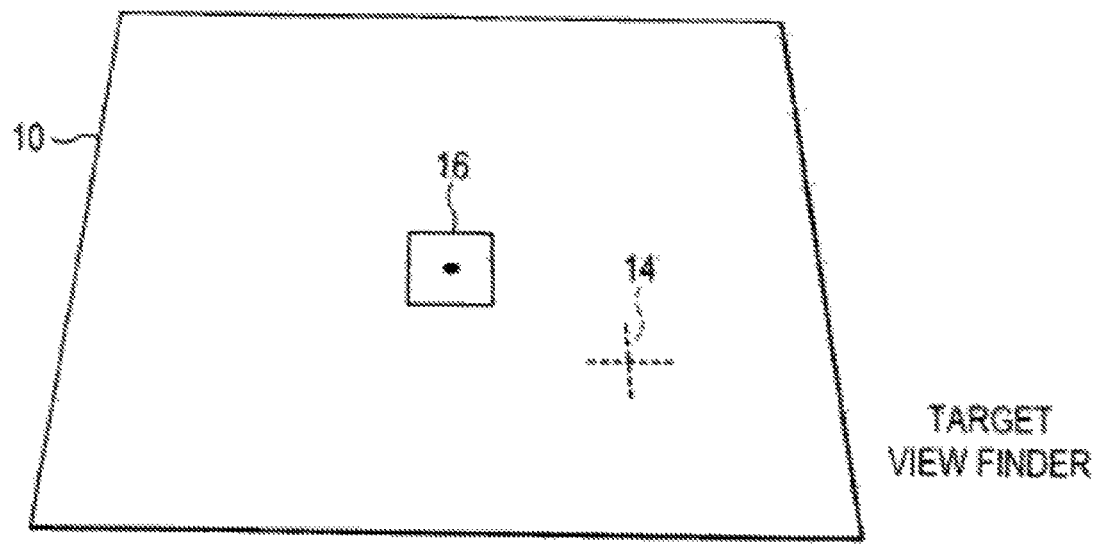
FIG. 2 is a plan view of a target view finder display for automatic image capture according to the present invention.

Alternatively as shown in FIG. 2, a cross-hair 14 may be provided that moves with the pitch and roll of the camera while a small target box 16 is centered statically within the view finder 10. The user moves the camera to move the cross-hair 14 into the target box 16, assuring proper camera alignment with the document. When the camera is misaligned with respect to the document, the target box 16 and cross-hair 14 may have a distinctive color, such as cyan, and the live video feed is darkened significantly. Also the trapezoidal view finder 10 may turn from a solid outline to a dashed outline with some guidance text shown on the display, such as "Tilt camera to align cross-hair within box." When the camera and document are aligned, the video feed of the document is restored to its normal brightness, and the target box 16 and cross-hair 14 change to a positive color, such as green. The target box 16 and cross-hair 14 remain the positive color as the rest of the conditions required for image capture are achieved.

A warning icon is displayed when there is low light on the document to be captured. Brightness may be measured by averaging pixel values that approximate luminance in several areas within the trapezoidal view finder, i.e., taking the average of the pixel values that reside within each sub-area of the document image. This avoids acceptance of strong shadows that might otherwise increase error rates in the post-processing steps. Again, text might be displayed, if the brightness is insufficient, to instruct the user to provide more light for the document.

Figure 3:
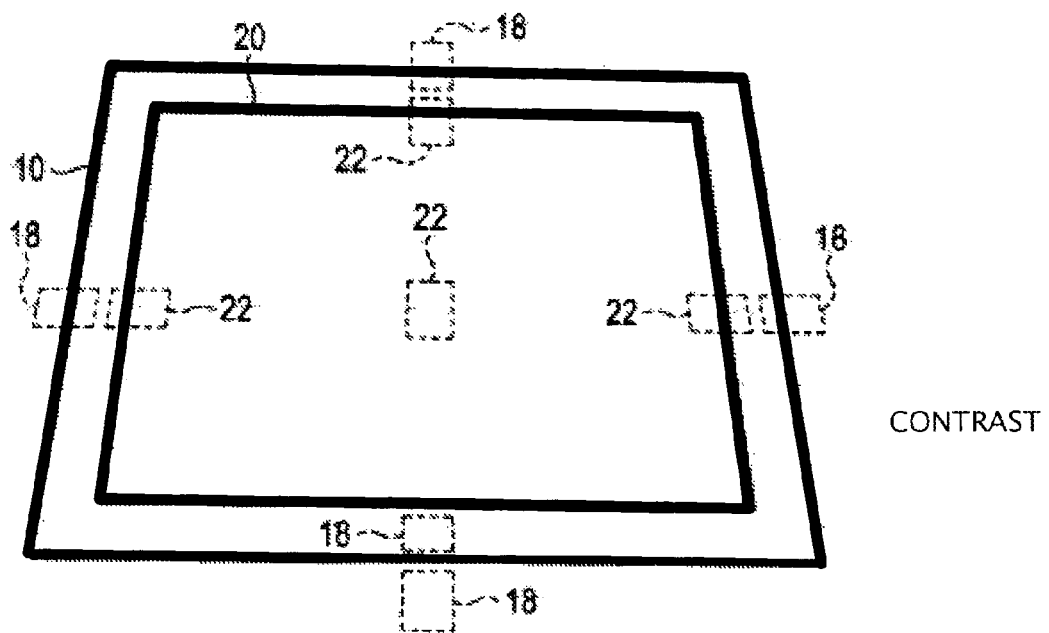
FIG. 3 is a plan view of a contrast display for automatic image capture according to the present invention.

As shown in FIG. 3, a patterned or colored area 18 outside the view finder 10 is used to indicate poor contrast. The application software compares pixels inside and outside the document image 20 in different areas to determine if sufficient brightness contrast exists. A warning icon and text also suggests corrective action to increase contrast, such as changing the background against which the document is placed. Selected pixels 18, 22 both within and outside document image 20 are summed separately, a threshold is created using a center value between the two sums, and the average within the document to that outside the document is compared. A low difference indicates poor contrast.

Figure 4:
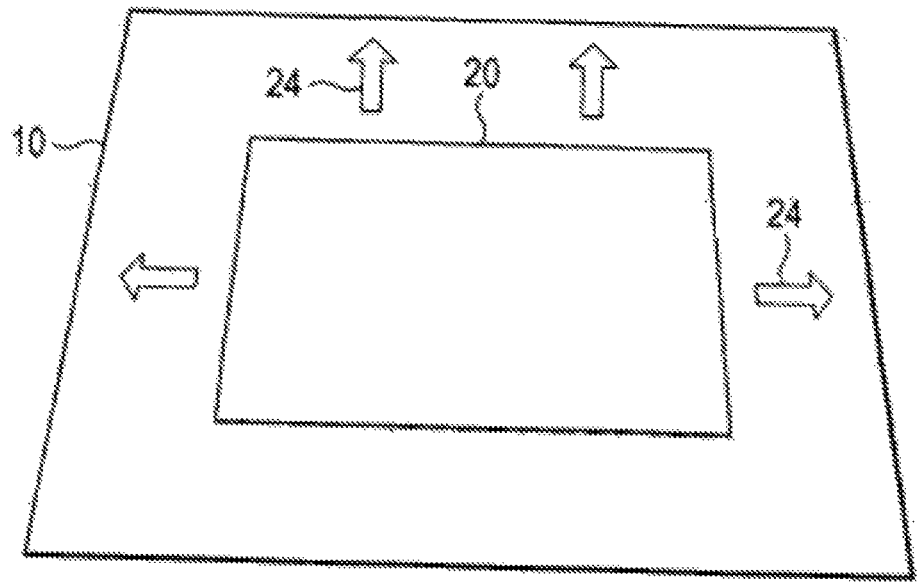
FIG. 4 is a plan view of an occupancy display for automatic image capture according to the present invention.

With camera orientation and brightness/contrast being satisfactory, the user is then guided to fill the view finder 10 with the document 20, as shown in FIG. 4. Using as much of the view finder 10 as possible reduces noise in the final image. Arrows 24 or other indicators on the display guide the user to move the camera closer or farther back to align the document image 20 optimally within the trapezoid view finder 10. The arrows 24 may be colored, such as red. To determine the state of each arrow 24, a first order differential is applied at each of four specific locations and determines if the difference is high enough. This is similar to contrast, but is measured separately at the four points shown by the arrows 24. Each point of measure has an equivalent warning arrow 24 that illuminates when the differential is too low. The four areas are: (1) each side at the center row of the view finder 10—this is a horizontal differential that is maximized when the edge of the document image 20 is within a given offset with the view finder; and (2) top left (set in) and top right (set in)—these are vertical differentials that are maximized when the top edge of the document image is aligned with the top edge of the view finder, minus a few rows. Using two arrows 24 at the top minimizes any rotation of the document image 20, which enables corner detection in the next step. There is no need for bottom arrows, which allows for documents having different aspect ratios, such as business/personal checks and letter/legal sized pages, to be imaged and captured.

As an alternative to using arrows to indicate occupancy, the user may be guided to fill the view finder area by animated movements of the view finder that suggest actions the user should take to improve occupancy. For example, when the camera is too close to the document and the document image exceeds the bounds of the view finder, the view finder may show a repeating expanding motion—the view finder animates a series of increased sizes to suggest pulling back of the camera by the user. Also for example, when the camera is too far away from the document such that the document image is occupying too small an area in the view finder, the view finder may animate a shrinking motion. This would suggest to the user that the camera should be moved closer. Similar animations may be used to suggest moving the camera left or right, up or down, etc. The distances from the edge of the document image to the edges of the view finder would provide the information as to the required direction of movement, i.e., the distance from the top of the document image to the top of the view finder may be significantly greater than the distance from the bottom of the document image to the bottom of the view finder so the camera should be moved up to center the document image within the view finder, as an example.

Figure 5:
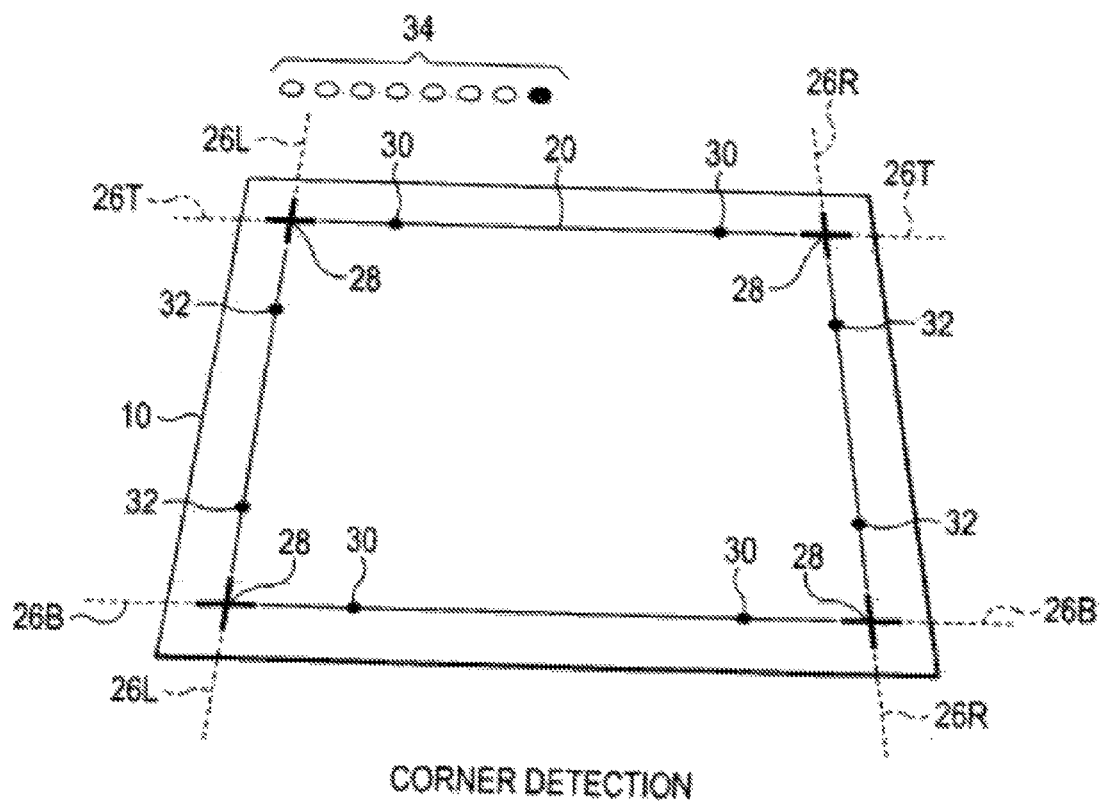
FIG. 5 is a plan view of a corner detection display with status indicators for automatic image capture according to the present invention.

For edge and corner detection as shown in FIG. 5, a first order differential is applied in eight critical areas to determine four lines 26L, R, T, B that make up the outline of the document image 20. The intersections of the four lines 26L, R, T, B determine the corners 28. This assures that a rectangle is present within the optimal area of the view finder 10. This step is very fast. An audible "beep" may be provided to help give the user the feeling of progress each time the four corners 28 are located.

More specifically in each corner the application software tries to find two points as the upper/lower points 30 and the outer points 32. This leads to the four lines: upper, lower, left and right. The left and right lines 26L, R are found by connecting the two outer points 32, and the upper and lower lines 26T, B are found by connecting the two upper and lower points 30 respectively. To find each point 30, 32, a first order differential is used starting, for example, ten percent (10%) outside the view finder 10 and moving inwards until ten or twenty percent (10-20%) inside the view finder. The point at which the maximum luminance change occurs, i.e., the transition between the background and the document image 20, is considered the edge of the document. This process is repeated for each of the eight points 30, 32. Finally projections of the lines 26L, R, T, B are intersected to produce the corners 28. The four corners are used in post-processing to improve performance and accuracy of the final document bounds detection.

The application software provides a warning while the camera is automatically focusing to give the user feedback that the capture process is still proceeding.

The final condition, if necessary, is stability, where motion sensors are used to measure the physical motion of the intelligent mobile device. This condition may not be necessary for image capture, but may be included in the event there is a possibility of excessive motion during the capturing of the final image. Excessive motion may cause blurring and increase the error rate in post-processing. Accelerometer data is acquired from the intelligent mobile device and filtered using a lowpass filter. High vibration causes blurs, but low vibration does not. Excessive low frequency movement, such as moving closer to the document, may trigger an "out-of-focus" condition that would return the application software to the focus step. If high frequency motion, such as camera vibration, is detected, a warning icon and corrective help text may be provided on the device display until stability is achieved. Once stable, all of the conditions required to capture the image have been set, and the application software automatically captures the image of the document and proceeds to the post-processing and filtering, as described in the afore-mentioned pending U.S. patent application Ser. No. 12/930,630.

Figure 6:
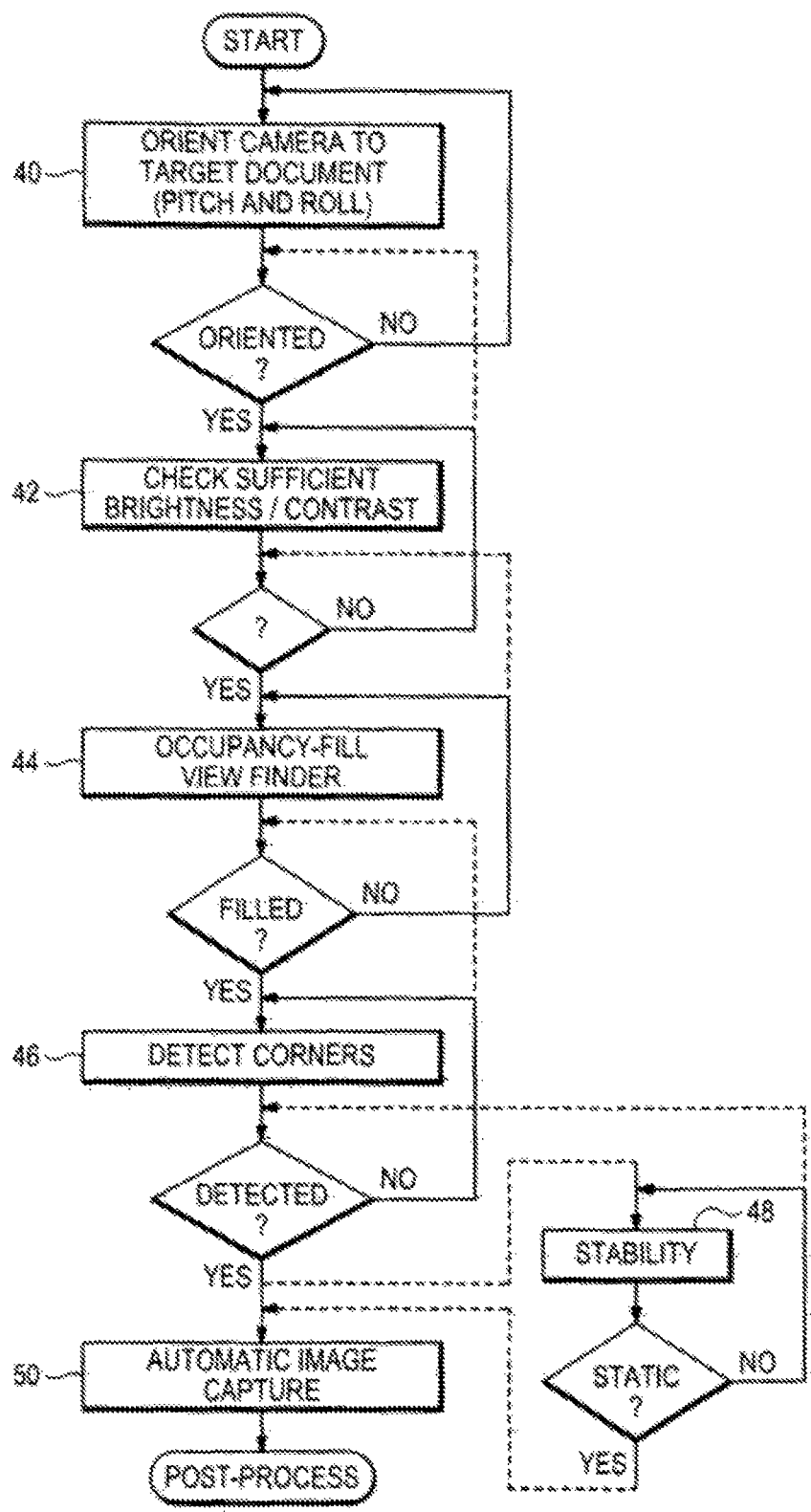
FIG. 6 is a flow diagram view of the application software for automatic image capture according to the present invention.

All of these steps are combined into a framework that guides the user through the required conditions in a natural order, as shown in FIG. 6. When the application software starts, the first step 40 is orientation of the camera with respect to the target document. The next step 42 is to check for sufficient brightness and contrast for the target document. At this point occupancy is checked as the next step 44 to assure the document image fills the view finder. The final step 46 is to detect the corners of the document image. An additional step 48, as necessary or desirable, is to check for excessive motion to assure sufficient stability of the camera with respect to the target document to prevent blurring. Once all the conditions of the previous steps are satisfied, then the automatic image capture 50 of the target document occurs and the captured image is passed to post-processing algorithms before being transmitted to the remote location. In the event that any of the conditions of prior steps fail before the image capture step 50, the process returns to the immediately preceding step of the failed condition and repeats the ensuing steps.

These steps may include other conditions not listed above which have already been described in U.S. Pat. No. 8,532, 419. The user is only provided with the lowest "out of bounds" conditions that require corrective action. There is no sense trying to fix "focus" if there is not enough "brightness." Likewise view angle adjustment is the first step 40 because moving the camera around changes all of the other conditions. A progress meter 34, shown in FIG. 5 for example, that has a simple color indicator for each step may be presented at the top of the view finder 10 to give the user feedback as to where they are in the process of getting a good image capture of the document.

Figure 7A:
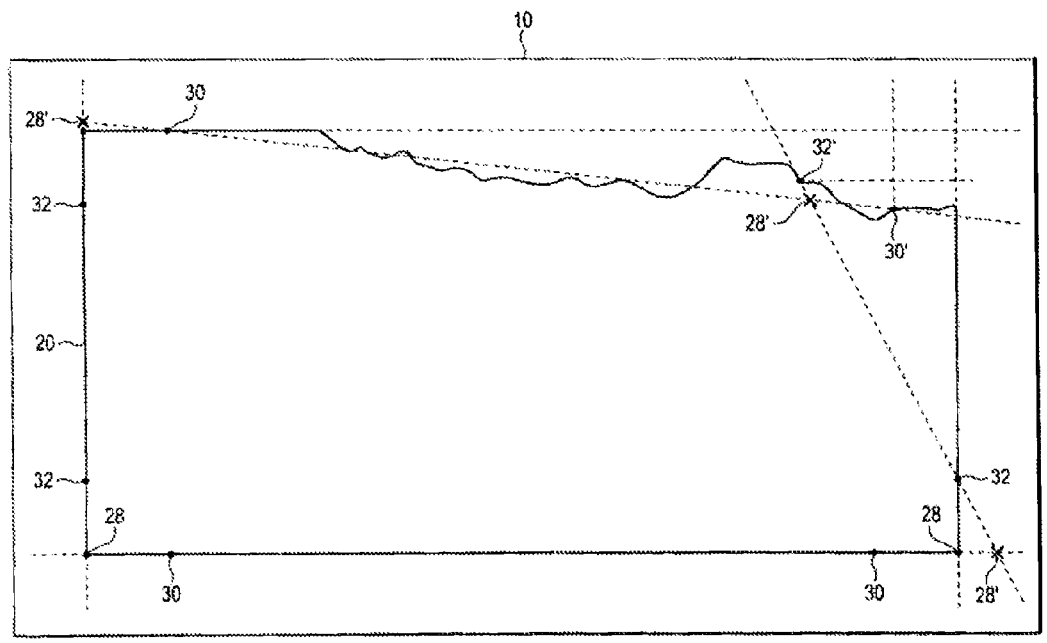
FIGS. 7A and 7B are plan views of damaged documents, either torn or with a folded corner, where edge detection is appropriate for determining corners for automatic image capture.
Figure 7B:
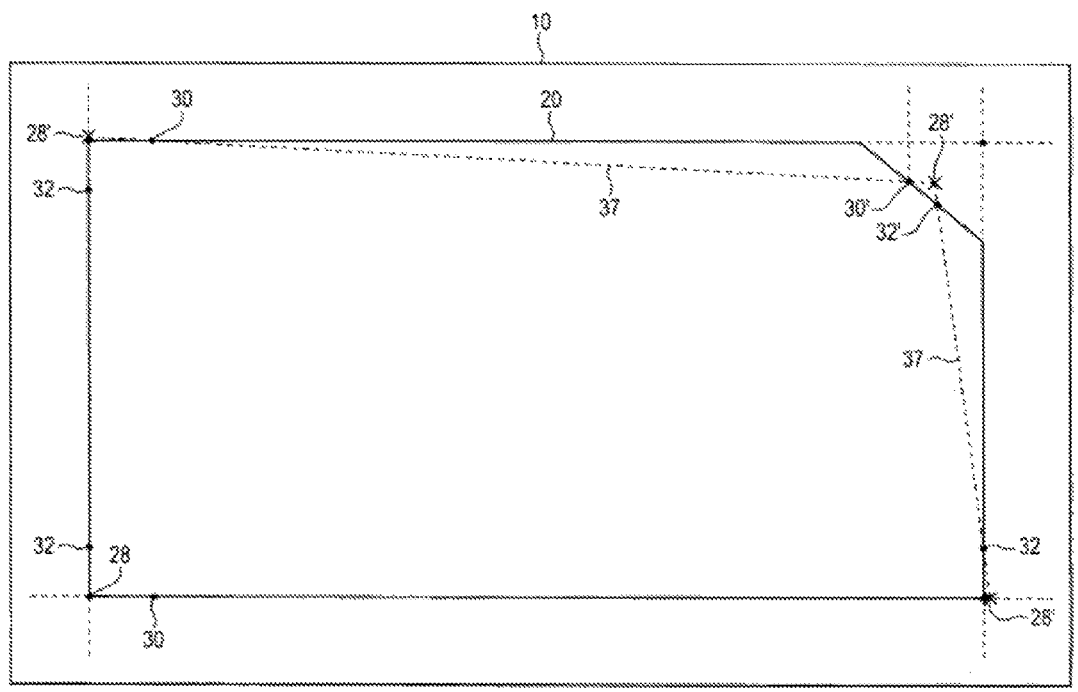

Damaged checks, which happen to have damage in the differential measurement areas described above with reference to FIG. 5, pose a problem for corner detection. Such damages include tears, folds and wrinkles in both the flat surface plane as well as the z-axis for non-flattened documents, as shown in FIGS. 7A and 7B. If all four corners are not detected accurately, the above-described corner detection algorithm illustrated in FIG. 5 fails to converge. Further, documents with a long tear 33, such as along the top edge shown in FIG. 7A, greatly skew that location's differential point 30'/32', and cause a meaningful skew of the resulting connected line 37 through the good point 30/32 and an erroneous point 30'/32'. Likewise the fold at the upper left corner shown in FIG. 7B causes a meaningful skew. This leads in turn to incorrect de-skewing of the document in the post-processing phase, resulting in further errors.

A further improvement to the corner detection algorithm reduces sensitivity to lighting, relaxes the occupancy tolerance since occupancy occurs now after corner detection, and more particularly reduces skew errors on damaged and folded documents, which is the greatest source of errors. The document image is converted to grey scale, and then to line art with an edge detector, such as the Canny method. Next, the maximum contour areas are found using chain approximation, removing all other pixels from the image. This modified image is divided into two halves to make corner detection less prone to false discovery. Each half has a Hough line transform applied to find all major lines, which usually are many. The intersection of all lines are found, which again produces many points. Aggregation and isolation of the points for each corner are then achieved with a clustering method, such as K-nearest means, to result in the desired number of corners—in this case two since the image is divided in half. Combining the two halves provides the location of all four corners of the document based on the best lines in the image. "Best" means longest and largest in encompassing area.

Occupancy is then calculated after corner detection, as compared to the first-described method above where corner detection occurs after occupancy is determined. With this alternative edge detection scheme for determining document corners, occupancy is based on the corner locations. Therefore, occupancy has a much wider range of acceptable values, and may be used to require that the document just fit within the mobile device's camera view finder. Thus the image is larger than some minimum size by percentage of available view finder size. A simple test that all four corners are present in the view finder, and that the area of the document image is sufficient, allows for a much wider range of acceptable rotations and trapezoidal skews of the document.

Also, by finding the longest and strongest lines of the document image, the corner detection scheme is tolerant of a wide variety of damage and folds in the document. Looking at the line as a contour further reduces differential errors of lighting. Accepting a wider range of document rotation and skew angles, without requiring minimum occupancy first, allows the user to make faster and easier automatic image captures of the document, resulting in greater ease of use and reduced post-processing errors.

Figure 8:
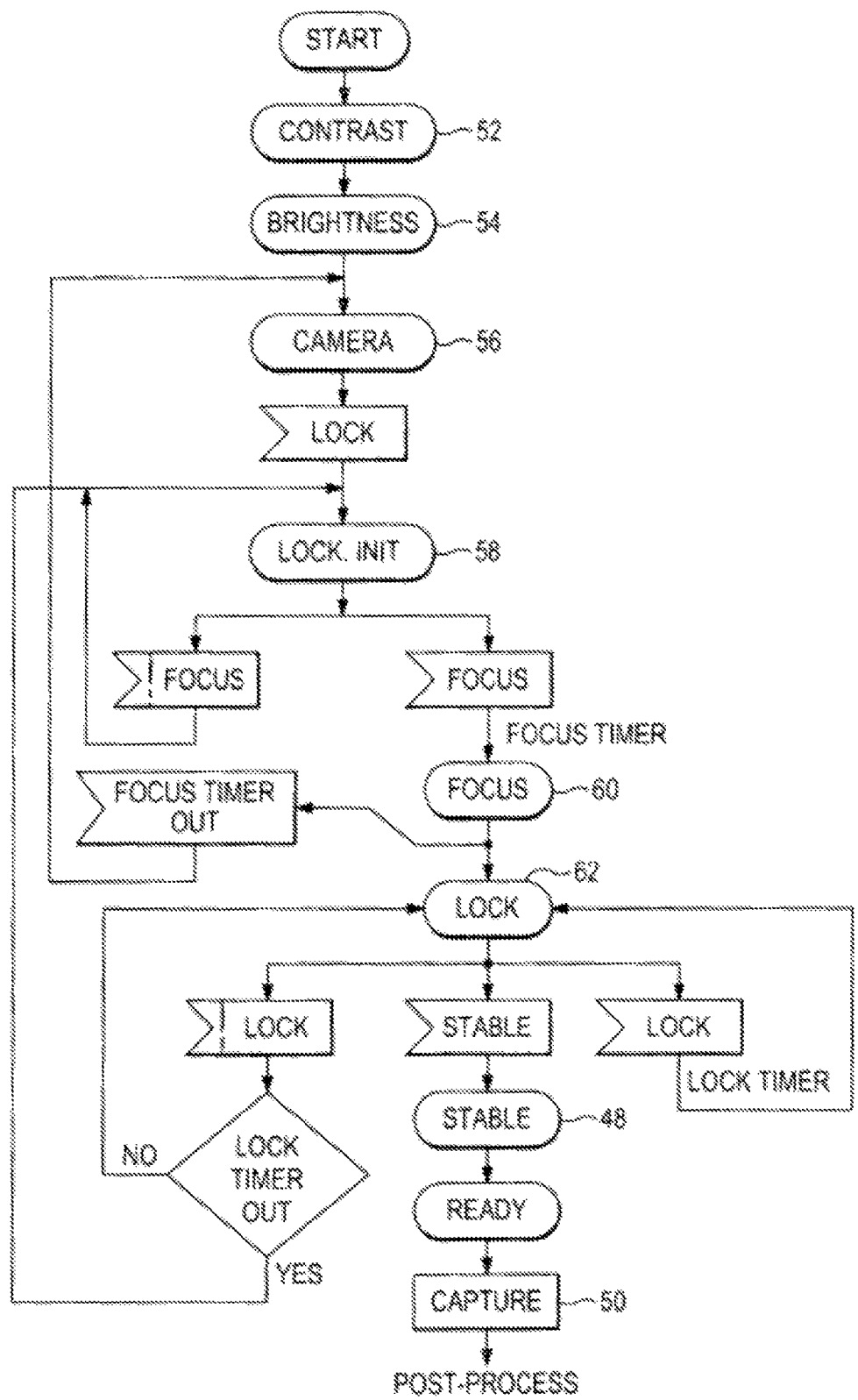
FIG. 8 is a flow diagram illustrating another embodiment of the application software using edge detection for automatic image capture according to the present invention.

FIG. 8 shows the modified process as compared to that shown in FIG. 6. FIG. 8 is an ITU Z.100 Finite State Machine Diagram where ovals are "states" and the notched rectangles are "events." When the capture software on the mobile device is initiated, the contrast and brightness/lighting (states 52, 54) are determined as described above to enable the mobile device camera. Then a camera state 56 determines the edges, as described above, to determine the document corners prior to occupancy. Since many cameras on mobile devices may not have auto-focus, but rather push focus way out and then back in to determine focus, once the software detects the "lock" event, the "lock.init" state 58 is achieved and focus is triggered. Once the document is in the "focus" state 60, another "lock" event occurs to enter the "lock" state 62. If focus is not achieved within a specified timeout period, then the software returns to the "camera" state 56 to re-determine corners and occupancy.

If the document image is stable, the document image is captured. The process stays in the "lock" state 62 for a duration determined by a lock timer. IF the lock timer times out, then the process returns to the "lock.init" state 58, and the focus process is repeated. If the image is stable, and the lock timer has not timed out, then the document image is captured by the mobile device for post-processing.

Besides the syntactic image features described above, the stream of images may be analyzed using a semantic analysis of an image from the stream of images. Using such semantic knowledge of the document type being captured allows the application of quantitative analysis to further improve the capture process by improving the quality and accuracy of the captured image.

One way to use semantic knowledge is to apply optical character recognition (OCR) to the document image and measure the confidence level of each character in the document image. This assumes that the user knows what to expect in the document, e.g., a lot of numbers, letters or symbols in certain places. One example is the magnetic ink character recognition (MICR) in the lower ¼" row of a bank check. This is generally effective on any kind of readable document.

Therefore the entire document is subjected to OCR where certain combination of letters and numbers are expected, and the overall average of the confidence of the symbol matches. Measuring confidences in symbol matches may be done in many ways. One way is to use K-nearest clustering methods and compute the K nearest neighbors after training the system with many sample symbol images. A matched symbol from the document image has an accuracy that may be combined with the accuracy of some or all of the other matched symbols to determine an overall average, median or some such measure of global accuracy. This is using semantic knowledge of the document's expected symbol set, be it numbers, letters, glyphs or a combination thereof.

Another way to use semantic knowledge is to apply OCR and compare the result with an expected result. For example, a checksum of the first N−1 digits of a bank routing number on a check may be compared to the Nth digit. If the confidence is good on all the OCR'd numbers, and the checksum matches the last digit, then there is good confidence that the captured image is a good likeness of the original document. In other words the MICR on a check may be used to estimate the document image quality by comparing the OCR'd MICR value with the expected checksum of the MICR's bank routing number. In this example the mobile device software captures the document image, applies OCR to the MICR symbols, computes the checksum according to the definition of the MICR standard, and compares the 9.sup.th digit of the bank routing field to the calculated version of the 9.sup.th digit. In this way the expected value is compared to the computed value which results in a high level of confidence that the MICR has been correctly OCR'd. From the checksum match, a good image of the document is inferred.

These semantic knowledge processes described above are done automatically on the mobile device at a rate of many times per second, and are transparent to the user. Thus no human intervention is required while resulting in an improved automatic image capture.

Another example taken from bank checks is the fact that the amount field is located in at least two places on the check, and sometimes three places. By comparing the check amount recognition (CAR) and the legal amount recognition (LAR) and finding a match between the two, a high degree of confidence that the document image is clear and complete is achieved. On printed checks, the amount field also appears in the MICR, which serves as a third source for comparison.

Other examples of documents having semantically verifiable data are: (i) the date—calendar dates are easily detected and verified to be legal expressions of a date; (ii) check number, which appears in both the upper corner and within the MICR, may be compared; (iii) dollar total on a receipt; (iv) letter frequency on an OCR'd document; etc.

The result of the semantic knowledge application is the ability to pre-qualify images before a user is asked if the image is OK. Previously there was no way of knowing if the image captured was a napkin or a check. Now by reading the MICR and computing the average confidence as well as computing and comparing the checksum of the MICR routing field to the last digit of the field, which computations provide a good score, the resulting good score is used to accept the captured image from the stream of images with a much lower error rate when check images are submitted to a check processing center from the mobile device. It helps to overcome human limitations of the system, the biggest of which is laziness or ignorance when reviewing the final image before acceptance. This removes the need for the user to give a final qualitative test of the suitability of the document image.

By combining the user's eyes and problem solving ability with supportive image processing algorithms, the application software using syntactic criteria guides the user to capture a high quality image of the document sufficient to transmit to the remote location and be accepted at a very low error rate, giving the user an excellent experience while providing low cost of business. However by also using semantic language of the document being captured, the possibility of user error is reduced significantly, as the qualification is done automatically by the mobile device.

Thus the present invention provides an improved automatic image capture of a target document using an intelligent mobile device having a camera by providing application software that operates interactively with a user to assure that a series of conditions are achieved, starting with camera tilt relative to the target document, before the application software causes the camera to automatically capture the image of the target document for post-processing and subsequent transmission to a remote location.

The invention claimed is:

1. A method of automatic image capture of a target document using an intelligent mobile device having a camera comprising the steps of:
   showing a view finder on a display of the intelligent mobile device and a secondary view finder of corresponding shape to the view finder;
   lining up the two view finders until the secondary view finder superimposed on the view finder;
   guiding a user to maximize occupancy of the view finder with an image of the target document as a first condition;
   automatically capturing the target document image when the occupancy is maximized to produce a captured image; and
   semantically processing the captured image to qualify the captured image for transmission to a remote site.

2. The method as recited in claim 1 further comprising the step of:
   testing the target document for sufficient brightness and contrast with respect to a background for the target document prior to the capturing step.

3. The method as recited in claim 2 further comprising the step of:
   determining the corners of the target document image within the view finder prior to the capturing step.

4. The method as recited in claim 3 further comprising the step of:
   maximizing the occupancy of the target document image within the view finder after the corner determining step and prior to the capturing step.

5. The method as recited in claim 4 further comprising the step of:
   assuring focus of the camera with respect to the target document prior to the capturing step.

6. The method as recited in claim 5 further comprising the step of checking stability of the camera with respect to the target document prior to the capturing step.

7. A method of automatic image capture of a target document using an intelligent mobile device having a camera comprising the steps of:
   showing a view finder on a display of the intelligent mobile device and a secondary view finder of corresponding shape to the view finder;
   lining up the two view finders until the secondary view finder superimposed on the view finder;
   guiding a user to maximize occupancy of the view finder with an image of the target document as a first condition;
   automatically capturing the target document image when the occupancy is maximized to produce a captured image; and
   semantically processing the captured image to qualify the captured image for transmission to a remote site, wherein the semantically processing step comprising the steps of:
   providing semantic knowledge of the target document within the mobile device;
   by using symbol character recognition, measuring a confidence level of each symbol in the target document image based upon the semantic knowledge of the target document; and
   qualifying the target document image for transmission to a remote site when an average confidence level for all the symbols achieves a specified score.

8. A method of automatic image capture of a target document using an intelligent mobile device having a camera comprising the steps of:

showing a trapezoidal view finder on a display of the intelligent mobile device and
a secondary view finder of corresponding shape to the trapezoidal view finder;
lining up the trapezoidal view finder and the secondary view finder until the secondary view finder superimposed on the trapezoidal view finder;
determining the corners of the target document image within the trapezoidal view finder using edge detection and line projection;
maximizing the target document image within the trapezoidal view finder using the determined corners;
automatically capturing the target document image for post-processing; and
semantically processing the captured image to qualify the captured image for transmission to a remote site, wherein the semantically processing step comprises the steps of:
providing semantic knowledge of the target document within the mobile device;
by using optical symbol recognition, measuring a confidence level of each symbol in the target document image based upon the semantic knowledge of the target document; and
qualifying the target document image for transmission to a remote site when an average confidence level for all the symbols achieves a specified score.

9. The method as recited in claim 8 further comprising the step of:
assuring focus of the camera with respect to the target document prior to the capturing step.

10. The method as recited in claim 9 further comprising the step of:
semantically processing the captured image to qualify the captured image for transmission to a remote site.

11. The method as recited in claim 10 wherein the semantically processing step comprises the steps of:
providing semantic knowledge of the target document within the mobile device;
by using optical character recognition, measuring a confidence level of each character in the target document image based upon the semantic knowledge of the target document; and
qualifying the target document image for transmission to a remote site when an average confidence level for all the characters achieves a specified score.

12. The method as recited in claim 8 further comprising the steps of:
modifying capture parameters when the average confidence level is less than the specified score; and
repeating the measuring and modifying steps until the specified score is achieved.

13. The method as recited in claim 8 further comprising the step of:
comparing specific symbols identified by the optical symbol recognition to expected results based upon the semantic knowledge of the test document in order to improve the average confidence level prior to transmission to the remote site.

14. The method as recited in claim 13 further comprising the steps of:
modifying capture parameters when the average confidence level is less than the specified score; and
repeating the measuring, comparing and modifying steps until the specified score is achieved.

15. The method as recited in claim 7 wherein the view finder has a trapezoidal shape.

16. The method as recited in claim 7 further comprising the step of:
testing the target document for sufficient brightness and contrast with respect to a background for the target document prior to the capturing step.

17. The method as recited in claim 16, further comprising the step of:
determining the corners of the target document image within the view finder prior to the capturing step.

18. The method as recited in claim 16, further comprising the step of:
maximizing the occupancy of the target document image within the view finder after the corner determining step and prior to the capturing step.

19. The method as recited in claim 18 further comprising the step of:
assuring focus of the camera with respect to the target document prior to the capturing step.

20. The method as recited in claim 19 further comprising the step of checking stability of the camera with respect to the target document prior to the capturing step.

* * * * *